Patented Mar. 21, 1933

1,902,379

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

AGE RESISTING RUBBER COMPOUND AND PROCESS OF MAKING SAME

No Drawing. Application filed September 10, 1929. Serial No. 391,709.

This invention relates to processes for manufacturing vulcanized rubber products and to the products obtained thereby. It is more particularly directed to processes for vulcanizing rubber wherein there is incorporated into a rubber mix of vulcanization characteristics a compound of the type hereinafter disclosed whereby anti-oxidant or age resisting properties are developed in the vulcanized rubber product. The invention will be understood from the following description and examples of a preferred mode of operating the process wherein the invention is fully set forth and described.

The age resisting characteristics of a vulcanized rubber product can be readily ascertained by subjecting samples of the vulcanized product in a bomb to the action of oxygen under pressure and maintained for several hours at an elevated temperature. The treated samples are then examined and tested, and the results compared with similar results obtained by testing the unaged vulcanized stock. The deterioration in properties suffered as a result of the oxidation treatment is indicative of the result that would normally be expected from that particular stock during service. Such a test is known as the Bierer-Davis aging test and produces an effect on a vulcanized rubber stock comparable with that resulting from several years of natural aging of the rubber.

Certain compounds, for example aniline, the acetaldehyde reaction product of aniline hydrochloride, the aldol reaction product of alpha-naphthylamine and the like have been described previously as suitable materials to be employed in a rubber mix to lessen the tendency of a vulcanized rubber product to deteriorate by oxidation and to increase the effective life of the product.

According to the present invention, a new class of anti-oxidants or anti-aging compounds has been discovered which upon incorporation into a rubber stock impart such age resisting qualities to the vulcanized stock that samples thereof, when artificially aged according to the method hereinbefore described, retain to a remarkable degree their original unaged characteristics. The compounds imparting such anti-oxidant characteristics to vulcanized rubber, as disclosed in the present specification, comprise the sulfur derivative of the reaction product of diamino-diphenyl-methane and beta naphthol.

One of the preferred class of compounds, for example, the sulfur derivative of the reaction product of approximately one molar proportion of pp'diamino-diphenyl-methane and approximately two molar proportions of beta naphthol, was prepared in the following manner:

Substantially 11 molar portions of beta naphthol (1584 parts) and substantially 5.55 molar portions of p,p'diamino-diphenyl-methane (1100 parts) were placed in a reactor equipped with a condenser for distillation. The mixture was melted and a quantity of a catalyst, for example, iodine, equal to substantially 0.4% of the combined weight of the amine and beta naphthol added slowly thereto at a temperature of substantially 200 to 210° C. over a period of about five hours. Additional heating of the reaction product was carried out in a suitable bath for approximately five to ten hours at a temperature of substantially 200 to 210° C. The reaction proceeded smoothly with the splitting off of water. The product thus formed was a red tarry solid, plastic at room temperature. Substantially one atomic weight portion of sulfur (32 parts) was added to substantially one-fourth of a molar portion of the diamino-diphenyl-methane-beta-naphthol condensation product (112.5 parts) prepared as described. The mixture was melted, substantially 0.5% of a catalyst or condensing agent, for example iodine, added and the heating continued for substantially four hours on a suitable bath at approximately 200 to 210° C.

At the end of this period the reaction, which had proceeded smoothly with the evolution of hydrogen sulfid, was complete. The reaction product so obtained is a pitch-like solid.

A sample of this material was then incorporated in the well known manner in a typical tread stock comprising

|   | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl-guanidine | 1.0 |
| Anti-oxidant | 1.0 |

The stock was then vulcanized by heating sheets of the stock in the usual manner for sixty minutes at the temperature given by forty pounds of steam pressure per square inch, that is, 287° F. Portions of the stock thus cured were then artificially aged by heating samples of the said stock in an oxygen bomb for thirty hours at a temperature of 70° C. and under a pressure of 300 pounds of oxygen per square inch. The results obtained by testing the aged and unaged stocks follow:

*Table I*

| Hours aged | Modulus of elasticity in lbs/in² at elongations of | | Tensile at break in lbs/in² | Ultimate elongation |
|---|---|---|---|---|
| | 300 per cent | 500 per cent | | |
| 0 | 1465 | 3375 | 4100 | 585 |
| 30 | 1200 | | 1705 | 390 |

These results clearly show that the preferred class of materials possess anti-oxidant properties since a sample of a like stock but containing no anti-oxidant when aged under similar conditions melts to a shapeless, sticky mass that is incapable of test.

Another example of the preferred class of anti-oxidants was prepared by reacting substantially one-tenth of a molar portion of the condensation product of substantially two molar proportions of beta-naphthol and substantially one molar proportion of diamino-diphenyl-methane (45 parts) and substantially two-tenths of an atomic weight portion of sulfur (6.4 parts). This material was prepared in a manner analogous to that previously described wherein substantially one atomic weight portion of sulfur was reacted with substantially one-fourth a molar portion of the diamino-diphenylmethane-beta-naphthol condensation product with the exception that the quantity of catalyst was increased to one per cent. The product formed was a brittle pitch-like solid.

Samples of this material were also incorporated in a tread stock comprising:

|   | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl-guanidine | 1 |
| Anti-oxidant | 1 |

The stock was then vulcanized by heating in the usual manner for different times at the temperature given by forty pounds of steam pressure per square inch. Samples of the stock thus cured were then artificially aged in the manner previously described for thirty hours at 70° C. and under a pressure of 300 pounds of oxygen per square inch. The results obtained by testing the aged and unaged vulcanized rubber products are given in Table II.

*Table II*

| Time of cure | Hours aged | Modulus of elasticity in lbs/in² at elongations of | | Tensile at break in lbs/in² | Ultimate elongation |
|---|---|---|---|---|---|
| | | 300 per cent | 500 per cent | | |
| 30 minutes at 287° F | 0 | 1039 | 2545 | 3645 | 640 |
| Do | 30 | 1033 | 2265 | 2665 | 560 |
| 60 minutes at 287° F | 0 | 1510 | 3520 | 4230 | 565 |
| Do | 30 | 1438 | 2795 | 3100 | 550 |
| 90 minutes at 287° F | 0 | 1765 | 3855 | 4490 | 565 |
| Do | 30 | 1705 | | 2710 | 460 |

It is seen from Table II that the aged vulcanized rubber stock wherein one of the preferred type of compounds was employed as an anti-oxidant, retained to a great extent its original unaged characteristics.

Another example of the preferred type of anti-oxidants comprises the reaction product of substantially one-tenth of a molar portion (45 parts) of the condensation product of substantially two molar proportions of beta-naphthol and substantially one molar proportion of p,p'diamino-diphenyl-methane and substantially one-tenth an atomic weight portion (3.2 parts) of sulfur. This material was also prepared in a manner analogous to that employed in the preparation of the reaction product of substantially one-fourth of a molar portion of the diamino-diphenyl-methane-beta-naphthol condensation product and substantially one atomic weight portion of sulfur with the exception that the quantity of catalyst or condensation agent was increased to approximately one per cent.

Samples of this material were also incorporated in the usual manner in a tread stock comprising

|   | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl-guanidine | 1 |
| Anti-oxidant | 1 |

The stock was then vulcanized by heating in a press in the usual manner and the vulcanized rubber product then artificially aged in the manner hereinbefore described at 70° C. and under a pressure of 300 pounds of oxygen per square inch. The results obtained by testing the aged and unaged vulcanized rubber products are shown in Table III.

Table III

| Time of cure | Hours aged | Modulus of elasticity in lbs/in² at elongations of | | Tensile at break in lbs/in² | Ultimate elongation |
|---|---|---|---|---|---|
| | | 300 per cent | 500 per cent | | |
| 30 minutes at 287° F | 0 | 891 | 2265 | 2765 | 630 |
| Do | 30 | 932 | 2120 | 2480 | 560 |
| 60 minutes at 287° F | 0 | 1355 | 3260 | 4355 | 600 |
| Do | 30 | 1330 | 2745 | 3070 | 570 |
| 90 minutes at 287° F | 0 | 1600 | 3545 | 4190 | 570 |
| Do | 30 | 1535 | 2860 | 2860 | 500 |

The reaction product of substantially one molar portion of the diamino-diphenyl-methane-beta-naphthol condensation product and substantially one atomic weight proportion of sulfur has also been employed in a pure gum stock of the following composition:

| | Parts |
|---|---|
| Pale crepe rubber | 100 |
| Zinc oxide | 5 |
| Sulfur | 3.5 |
| Diphenyl-guanidine | 0.8 |
| Anti-oxidant | 2.0 |

Samples of the compounded rubber stock were then vulcanized by heating in a press in the usual manner and the vulcanized rubber product artificially aged in the manner hereinbefore described at 75° C. and under a pressure of 400 pounds of oxygen per square inch. The tensile data obtained by testing the aged and unaged vulcanized rubber stocks follow:

Table IV

| Time of cure | Hours aged | Modulus of elasticity in lbs/in² at elongations of | | Tensile at break in lbs/in² | Ultimate elongation |
|---|---|---|---|---|---|
| | | 300 per cent | 500 per cent | | |
| 30 minutes at 287° F | 0 | 241 | 806 | 3770 | 740 |
| Do | 18 | 246 | 394 | 2725 | 685 |
| 45 minutes at 287° F | 0 | 373 | 1340 | 4065 | 680 |
| Do | 18 | 386 | 1500 | 2015 | 555 |

The data disclosed in Tables III and IV show that the preferred class of materials show exceptional power as anti-oxidants.

The reaction product of substantially one molar proportion of the condensation product of substantially one molar proportion of p,p'diamino-diphenyl-methane and substantially two molar proportions of beta-naphthol and substantially one-half and one-fourth atomic weight proportions of sulfur respectively prepared in a manner similar to that hereinbefore described have been incorporated in tread and pure gum stocks, and have been found, on testing the vulcanized rubber stock, to possess exceptional anti-oxidant properties.

In all the examples hereinbefore set forth, diphenyl-guanidine was employed as an accelerator because it is known to produce a vulcanized rubber stock that has particularly poor aging qualities. Other accelerators than diphenyl-guanidine could of course be employed in conjunction with the preferred class of anti-oxidants and in the manner as described.

The various examples hereinbefore set forth in detail are to be understood as illustrative only and not at all limitative of the scope of the invention. Other compounding ingredients and other proportions of ingredients than those indicated in the various examples may be employed in the manufacture of various types of vulcanized rubber products, as is well known to those skilled in the art to which the invention pertains. The invention is to be understood as limited solely by the claims attached hereto as a part of this specification wherein the invention is claimed as broadly as is possible in view of the prior art.

What is claimed is:

1. The process of manufacturing an age resisting vulcanized rubber product which comprises curing a rubber composition of vulcanization characteristics in the presence of an anti-oxidant comprising a sulfur derivative of a reaction product of substantially two molar proportions of beta-naphthol and substantially one molar proportion of p,p'-diamino-diphenyl-methane.

2. The process of manufacturing an age resisting vulcanized rubber product which comprises curing a rubber composition of vulcanization characteristics in the presence of a product formed by reacting substantially one atomic weight proportion of sulfur on substantially one molar proportion of a reaction product of substantially one molar proportion of p,p'diamino-diphenyl-methane and substantially two molar proportions of beta-naphthol.

3. A vulcanized rubber product possessing age resisting characteristics comprising the vulcanization product of a rubber stock containing prior to the vulcanization of said stock an anti-oxidant comprising a sulfur derivative of a reaction product of substantially two molar proportions of beta-naphthol and substantially one molar proportion of p,p'diamino-diphenyl-methane.

4. A vulcanized rubber product possessing age resisting characteristics comprising the vulcanization product of a rubber stock containing prior to the vulcanization of said stock an anti-oxidant comprising the product formed by reacting substantially one atomic weight proportion of sulfur on substantially one molar proportion of a reaction product of substantially one molar proportion of p,p'diamino-diphenyl-methane and substantially two molar proportions of beta-naphthol.

5. The process of manufacturing an age resisting vulcanized rubber product which comprises curing a rubber composition of vulcanization characteristics in the presence of a product formed by reacting substantially 3.2 parts of sulfur on substantially 45 parts of the reaction product of substantially 1100 parts of p,p′diamino-diphenyl-methane and substantially 1584 parts of beta-naphthol.

6. A vulcanized rubber product possessing age resisting characteristics comprising the vulcanization product of a rubber stock containing prior to the vulcanization of said stock an anti-oxidant comprising a reaction product formed by reacting substantially 3.2 parts of sulfur on substantially 45 parts of the reaction product of substantially 1100 parts of p,p′diamino-diphenyl-methane and substantially 1584 parts of beta-naphthol.

In testimony whereof I hereunto affix my signature.

WINFIELD SCOTT.